United States Patent Office 3,450,910
Patented June 17, 1969

3,450,910
PRESS SPEED CONTROL SYSTEM WITH EDDY CURRENT BRAKE-CLUTCH AND OVER-UNDER SPEED PROTECTIVE DEVICE
Ralph L. Jaeschke and Aubrey H. Smith, Kenosha, Wis., assignors to Eaton Yale & Towne, Inc., Cleveland, Ohio, a corporation of Ohio
Filed July 7, 1967, Ser. No. 651,831
Int. Cl. H02k 49/04
U.S. Cl. 310—95                          11 Claims

ABSTRACT OF THE DISCLOSURE

Apparatus for operating a press over a wide range of speeds or stroking rates from a flywheel which is rotated at substantially constant speed so that substantially constant energy is available per press stroke. The press is coupled to the flywheel through a coupling which includes an eddy current clutch and an eddy current brake and the clutch and the brake are energized under tachometer feedback control to maintain the press speed at a preselected level. The voltages applied to the clutch and brake are varied as inverse functions of the respective current level thereby to force or speed the response of the coupling. Further, over-under speed circuitry means are provided for deenergizing the coupling and for applying a mechanical brake if the actual speed of the press deviates from the desired speed by more than a preselected amount for more than a predetermined time.

Background of the invention

This invention relates to a protective speed control, and more particularly to such a control which will stop a driven member if its speed deviates significantly from a desired level.

Summary of the invention

Among the several objects of the present invention may be noted the provision of a protective speed control for a press or the like which will stop the press if its speed deviates significantly from a desired level; the provision of such a control which will stop the press if the instantaneous speed of the press deviates from the desired speed by more than a preselected amount for longer than a predetermined time; and the provision of such a control which is highly reliable and is relatively simple and inexpensive. Other objects and features will be in part apparent and in part pointed out hereinafter.

Briefly, a protective speed control drive system according to this invention includes a driving member and a driven member. The driven member is selectively coupled to the driving member through an eddy current clutch having a winding for energizing the clutch. An eddy current brake is provided for selectively braking the driven member, the brake having a winding by means of which the brake is energized. Means are provided for generating a feedback signal having an amplitude which varies as a function of the instantaneous speed of the driven member and for providing a reference signal having an amplitude which, at each instant, represents a preselected speed of the driven member. The clutch winding is energized to an extent which varies as a function of the algebraic difference between the reference and feedback signals and the brake winding is energized to an extent which varies as a function of the inverse of the algebraic difference between the reference and feedback signals. Means are also provided for stopping the driven member when the algebraic difference between the reference and feedback signals exceeds a preselected value for a predetermined time interval.

Brief description of the drawings

Corresponding reference characters indicate corresponding parts throughout the several views of the drawings.

Description of the preferred embodiment

Figure 1:
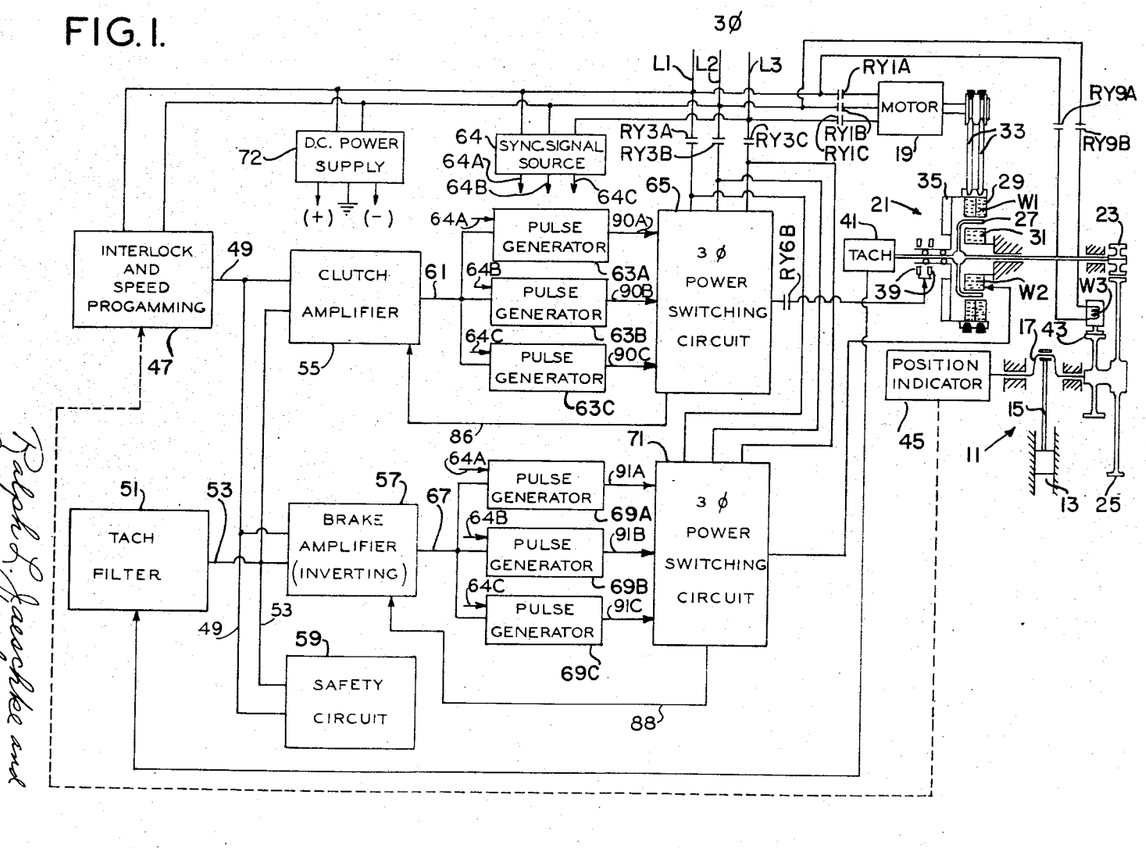
FIG. 1 is a block diagram of a press speed control system including protective safety circuits of the present invention.

Referring now to FIG. 1, there is indicated at 11 generally a press which may, for example, be a stamping press. Press 11 includes a ram 13 which is connected by a connecting rod 15 to a crankshaft 17. Power for operating the press is obtained from a main drive motor 19. Electric power for energizing motor 19 and the various other components of the press drive system described hereinafter is obtained from any suitable three-phase source (not shown) through three supply leads L1, L2 and L3. Motor 19 is connected to leads L1–L3 through relay or contactor contacts RY1A, RY1B and RY1C which are selectively operated by means described hereinafter. Motor 19 drives press 11 through an eddy current coupling indicated generally at 21 and a pair of speed reducing gears 23 and 25. Eddy current coupling 21 includes a driven inductor member 27, a driving field member or rotor 29 and a braking field member 31. The driving field rotor 29 is freely rotatable with respect to the inductor member 27 and is rotated at a subtsantially constant speed by motor 19 through belts 33. The driving field rotor 29 also provides the function of a flywheel for storing kinetic energy and for this purpose may also include supplementary rim weighting as indicated at 35. Since the flywheel or rotor 29 is driven at substantially constant speed, the kinetic energy stored therein is thus also maintained at a substantially constant level.

Rotor 29 includes a winding W1 which is energized through slip rings as indicated at 39 while the stationary braking field member 31 includes an energizing winding W2. As is understood by those skilled in the art, when winding W1 is energized, torque is coupled from the flywheel or rotating field 29 to the inductor 27. Similarly, when winding W2 is energized, a braking torque is developed between inductor 27 and the member 31 tending to slow the inductor.

An A.C. tachometer 41 is also coupled to inductor member 27. Since this member is positively coupled to the press 11 through gears 23 and 25, tachometer 41 provides an A.C. signal having an amplitude which varies as a function of, or is substantially proportional to, the instantaneous speed of the press.

In addition to the braking provided by the eddy current generating member 31, press 11 is also provided with a mechanical brake indicated generally at 43. Brake 43 is of the spring-loaded, air-operated safety type which is normally biased to stop the press but may be released by energizing a winding W3 through a set of relay contacts RY9A and RY9B. Winding W3 may, for example, open an air valve to release the brake.

Coupled to the crankshaft 17 is a position indicator 45 which, as is explained in greater detail hereinafter, may comprise merely a mechanical coupling which drives a set of switches in an interlock and speed programming circuit 47 so that successive switches are operated as crankshaft 17 moves from one angular position to another. Programming circuit 47 is operative to provide at a lead 49 a D.C. reference signal having an amplitude which, at each instant, represents a preselected speed of the press. The amplitude of the signal may, for example, vary with time under control of the position indicator 45 thereby to provide a contouring or programming of the speed of press 11 within each cycle of its operation. Such programming of speed within a single cycle may be desirable, as is understood by those skilled in the art, to provide a particular desired speed as the ram 13 moves into contact with the workpiece while providing also a minimum cycle time.

The A.C. signal provided by tachometer 41 is applied to a tachometer filter 51 which rectifies and filters this A.C. signal to provide at a lead 53 a D.C. feedback signal having an amplitude which varies as a function of the instantaneous speed of the press.

The reference and feedback signals are provided to a clutch amplifier 55, an inverting brake amplifier 57 and a safety circuit 59. Clutch amplifier 55 is operative to provide to a lead 61 an amplified signal which varies as a function of the amplitude of the reference signal relative to that of the feedback signal. In other words this amplified signal varies substantially as a function of the algebraic difference between the reference and feedback signals. This amplified signal is applied to three similar pulse generating circuits 63A, 63B and 63C. As is explained in greater detail hereinafter, each of these pulse generators provides a pulse signal which is synchronized with a respective phase of the three-phase A.C. supply and which occurs at a phase angle which varies as a function of the amplitude of the signal provided at lead 61. For this purpose respective A.C. synchronizing signals 64A, 64B and 64C are provided to each of these pulse generators from the lines L1, L2 and L3 by a circuit indicated generally at 64.

The pulse or triggering signals provided by the generators 63A–63C are applied to a three-phase power switching circuit 65. The power switching circuit 65 rectifies A.C. obtained from leads L1, L2 and L3 and applies to winding W1 a pulsating D.C. voltage which varies as a function of the phase angle of the triggering pulses provided by the pulse generators 63A–63C. This voltage applied to clutch winding W1 is thus varied as a function of the algebraic difference between the reference and feedback signals.

The brake amplifier circuit 57 provides to a lead 67 a D.C. signal having an amplitude which varies as a function of the inverse of the algebraic difference between the amplitudes of the reference and feedback signals. In other words, any given change in the relative amplitudes of the reference and feedback signals will produce changes of opposite or inverse polarity on the signals provided at the leads 61 and 67. This D.C. signal on lead 67 is applied to three similar pulse generator circuits 69A, 69B and 69C which are essentially identical with the pulse generators 63A–63C and which operate to provide triggering pulse signals at phase angles which vary in response to the amplitude of the control signal applied thereto. Pulse generators 69A–69C are similarly synchronized with respective phases of the three-phase supply by circuit 64. The triggering signals provided by the generators 69A–69C are applied to a three-phase power switching circuit 71 which is similar to circuit 65 and which applies to the brake winding W2, a pulsating D.C. voltage which varies as a function of the phase angle of the respective pulse signals. The voltage applied to the brake winding thus varies as a function of the inverse of the algebraic difference between the reference and feedback signals.

Power switching circuits 65 and 71 draw current from supply leads L1–L3 through relay contacts RY3A–RY3C which are operated by means described hereinafter. D.C. supply voltages for energizing the various electronic circuits which make up the programming, amplifying, pulse generating and safety circuits (described in detail hereinafter) are provided by a regulated D.C. power supply which is indicated generally at 72 and which is energized from leads L1 and L2.

Figure 2:
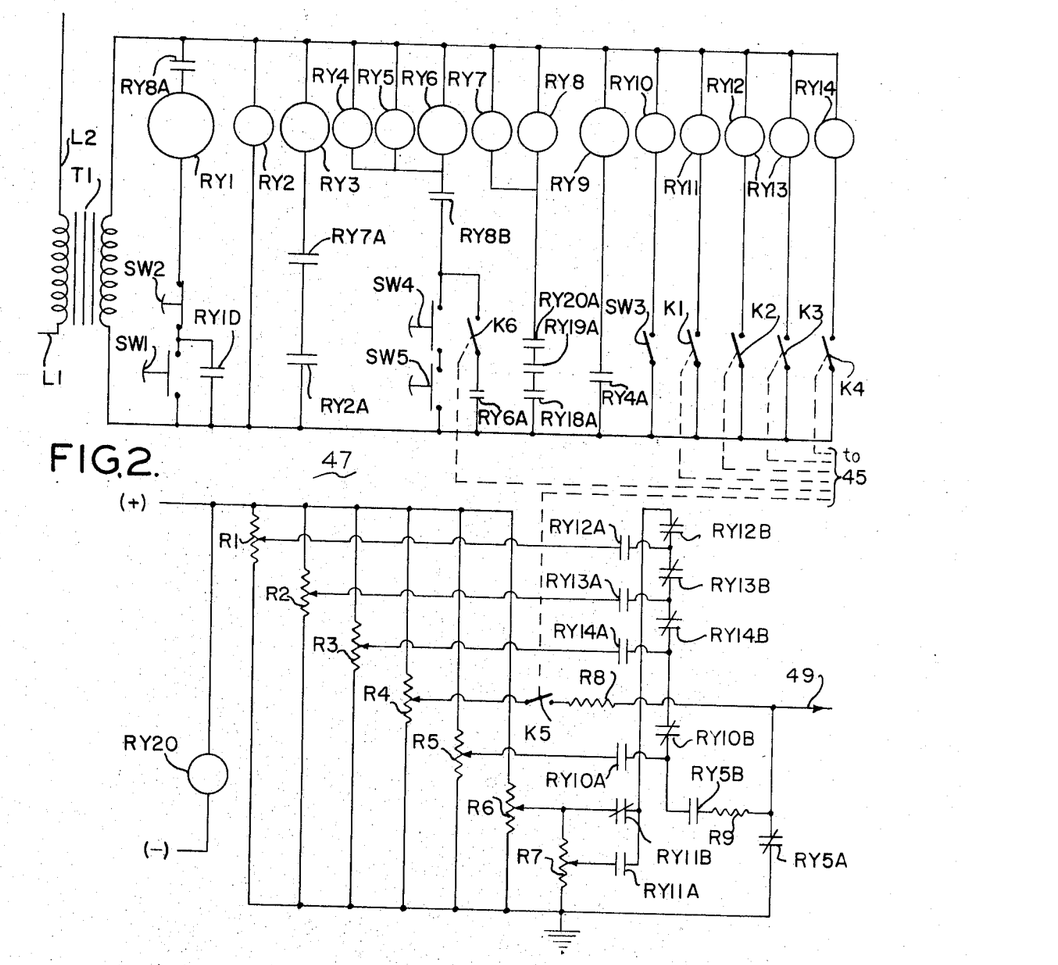
FIG. 2 is a schematic circuit diagram of the interlock and speed programming circuits employed in the system of FIG. 1.

In the interlock and speed programming circuitry shown in FIG. 2, relays are indicated according to the following convention. The operating coil or winding is designated by the letters RY and a respective number, e.g., RY1, RY2, etc., and the contacts operated by that winding are indicated by the same designation plus a respective letter suffix, e.g., RY1A, RY1B, would indicate contacts which are operated by the winding RY1. Normally-open contacts are indicated by spaced parallel bars alone while normally-closed contacts are indicated by similar bars which are crossed by a diagonal.

The windings of various control and operation interlock relays (RY1–RY14) are selectively energized from a transformer T1 which draws power from supply lines L1 and L2. Relay winding RY1, for example, operates the starting contactor for motor 19 and when energized, closes the contacts RY1A, RY1B and RY1C which are in series with the motor supply leads (see FIG. 1). Suitable overload protection for motor 19 may also be provided by means not shown.

Relay winding RY2 is operated when power is applied to the interlock and programming circuits 47 and thus closes the contacts RY2A which are in series with relay winding RY3.

When the positive and negative supply voltages are available from the power supply 72, D.C. operated relay winding RY20 is energized thereby closing the contacts RY20A which are in series with relay windings RY7 and RY8. Contacts RY18A and RY19A are normally closed by safety circuitry described hereinafter. Thus relays RY7 and RY8 are normally energized to operate their respective contacts.

With contacts RY7A closed and contacts RY2A closed as described previously, relay winding RY3 is energized to close the contacts RY3A–RY3C (FIG. 1) to provide power to the three-phase power switching circuits 65 and 71 which, as described briefly above, variably energize the eddy current windings W1 and W2.

With contacts RY8A closed, relay winding RY1 may be energized by closing a manually operable push-button switch SW1 thereby to start the motor 19. The closing of contacts RY1D establishes a holding circuit which keeps the motor energized. The motor may be stopped at any time by operating a normally-closed manual switch SW2.

Relay RY10 is operated under the control of a manual switch SW3 while relays RY11–RY14 are operated under the control of switches K1–K4 which are cam operated by the position indicator 45 in response to rotation of the press crankshaft 17. A fifth switch K5 and a sixth switch K6 are similarly operated by the position indicator. As noted previously, the switches controlled by position indicator 45 are operated in preselected sequence as the crankshaft 17 rotates.

A plurality of potentiometers R1–R6 are connected between the positive D.C. supply lead and ground to provide, at their respective variable taps, positive voltages which may be preselected by adjustment of the potentiometer. Another potentiometer R7 is connected between the movable tap of potentiometer R6 and ground to provide a voltage which is a preselected portion of the voltage present at the tap of potentiometer R6. The contacts operated by relay windings RY10–RY14 are connected so that a selected one of the positive voltages provided at the variable taps of potentiometers R1–R7 is applied to the reference signal lead 49 at each point within a cycle of rotation of the press crank shaft 17 or, alternatively, the voltage provided by potentiometer R5 is applied if the manual switch SW3 is operated. This latter voltage typically represents a low or "inching" speed as described in greater detail hereinafter. The currents which may be drawn from the various potentiometers are limited by a pair of resistors R8 and R9.

Relay windings RY4–RY6 are selectively energized by a pair of series connected, manually operable switches SW4 and SW5 which, as described in greater detail hereinafter, are employed to initiate a cycle of operation of the press. Switches SW4 and SW5 are bridged by position indicator switch K6 connected in series with a set of normally-open contacts RY6A which are operated by relay winding RY6. Switch K6 and contacts RY6A thus establish a holding circuit for the relay windings RY4–RY6.

Figure 3:
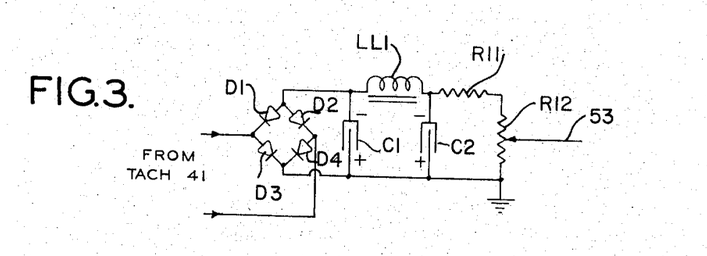
FIG. 3 is a schematic circuit diagram of the tachometer filter circuit employed in the system of FIG. 1.

Referring now to FIG. 3, the A.C. signal from tachometer 41 is full-wave rectified in a bridge rectifier constituted by diodes D1–D4 and the resultant pulsating D.C. is filtered by a pair of capacitors C1 and C2 and an inductor LL1 to provide a negative D.C. voltage relative to ground. This D.C. voltage is applied across a fixed resistor R11 and a potentiometer R12 and the movable tap of potentiometer R12 is connected to lead 53 to apply thereto a negative voltage which is a preselected portion of the filtered D.C. voltage. As is understood by those skilled in the art, the negative voltage on lead 53 thus varies as a function of and is substantially proportional to the speed of press 11.

Figure 4:
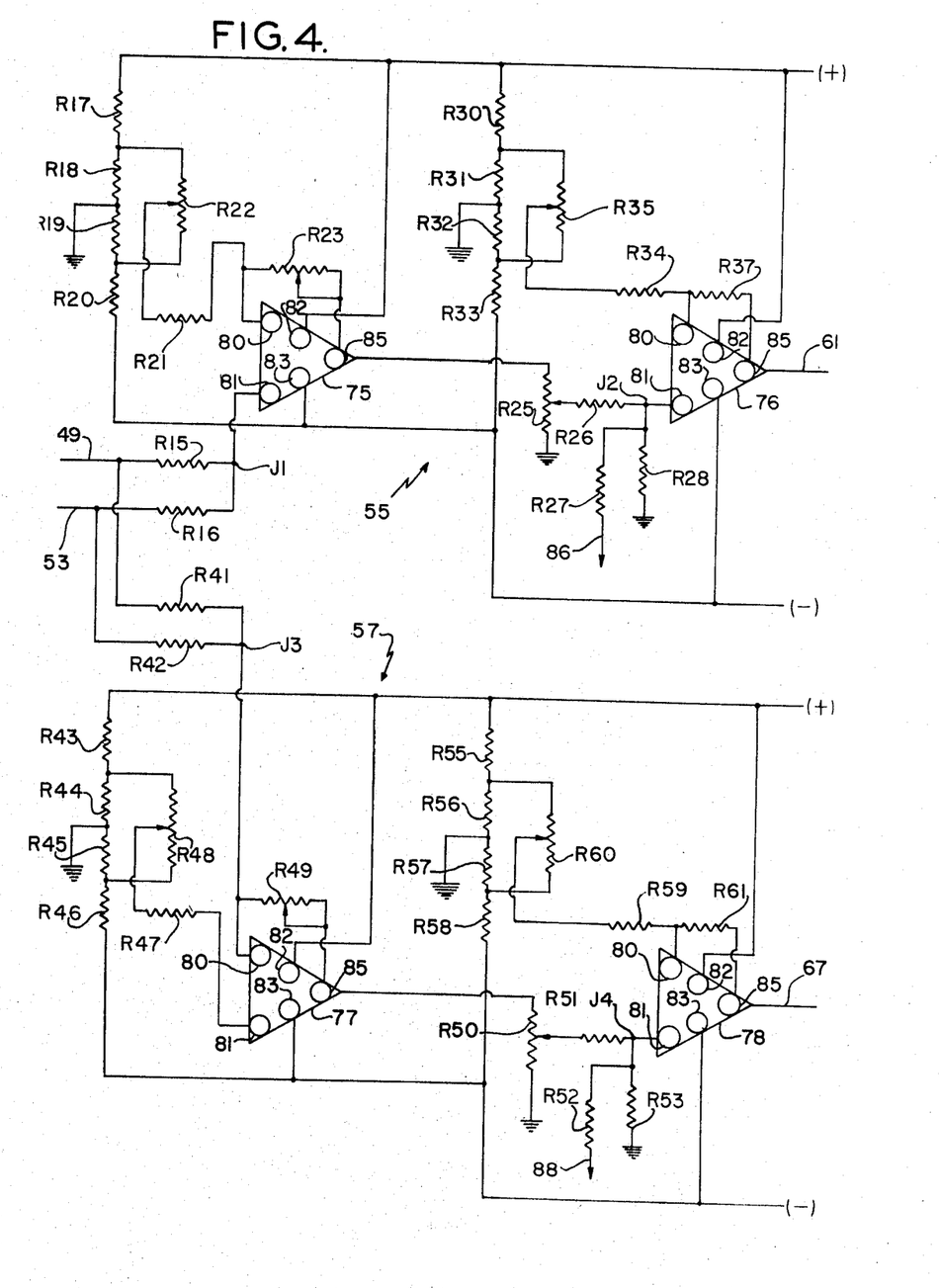
FIG. 4 is a schematic circuit diagram of the clutch and brake control amplifier stages.

As illustrated in FIG. 4, the clutch amplifier 55 and the inverting brake amplifier 57 each comprise a pair of differential amplifiers 75, 76 and 77, 78 respectively. Amplifiers 75–78 are preferably of the type known as "operational amplifiers" which are readily available from various commercial sources. Each of the amplifiers 75–78 includes a pair of input terminals 80 and 81, positive and negative supply terminals, 82 and 83 respectively, and an output terminal 85. As is understood by those skilled in the art, the voltage provided at the output terminal 85 varies as a function of the difference between the voltages applied at the input terminals 80 and 81, the output voltage becoming more positive as the terminal 81 is driven in a positive sense with respect to terminal 80. Negative feedback around the amplifier may thus be provided by a connection between the output terminal 85 and the input terminal 80.

The positive D.C. reference signal available through lead 49 and the D.C. tachometer feedback signal available through lead 53 are applied to a mixing junction J1 in the clutch amplifier circuit 55 through respective isolating resistors R15 and R16. The voltage at junction J1 thus varies as a function of the algebraic difference between the respective amplitudes of the reference and feedback signals and constitutes an error signal which is substantially proportional to the difference between the actual speed of the press and the desired speed as represented by the instantaneous level of the reference signal. This error signal is applied to the input terminal 81 of amplifier 75 and a preselected D.C. reference voltage is applied to the other input terminal 80 by a network comprising resistors R17–R21 and a potentiometer R22. The gain of amplifier 75 may be adjusted by means of a rheostat R23 connecting its output terminal 85 to the input terminal 80.

A preselected portion of the output signal of amplifier 75 is applied, by means of a potentiometer R25 and an isolating resistor R26 to a mixing junction J2. A feedback signal which represents and is substantially proportional to the current flowing in the clutch winding W1 (obtained as described in greater detail hereinafter) is applied to junction J2 from a lead 86 through an isolating resistor R27. This current feedback signal is applied to junction J2 in a sense which tends to oppose the output signal from amplifier 75 as the brake current increases, thereby providing negative current feedback as described hereinafter. Junction J2 is also biased with respect to ground by a resistor R28. The net voltage developed at junction J2 is applied to the input terminal 81 of amplifier 76. A preselected D.C. voltage is applied to the input terminal 80 of this amplifier by a network comprising resistors R30–R34 and a potentiometer R35 while the gain of amplifier 76 is predetermined by the value of a resistor R37 connecting its output terminal 85 to input terminal 80. The output signal from the terminal 85 of amplifier 76 is applied to lead 61 described previously.

The positive reference signal provided at lead 49 and the negative tachometer feedback signal provided at lead 53 are also applied to the brake amplifier 57. Each of these signal leads is connected to a mixing junction J3 through a respective isolating resistor R41 and R42 to provide an error signal as described previously. Junction J3 is connected to the input terminal 80 of amplifier 77 rather than to the input terminal 81 as in the clutch amplifier 55. Accordingly, amplifier 77 provides at its output terminal 85 a signal which is inverted as to polarity with respect to the input signal derived from junction J3. A preselected D.C. bias voltage is applied to the input terminal 81 by means of a network comprising resistors R43–R47 and a potentiometer R48. A rheostat R49 connecting the output terminal 85 of amplifier 77 to its input terminal 80 allows the gain of this amplifier to be adjusted.

A preselected portion of the output voltage of amplifier 77 is applied, by means of a potentiometer R50 and an isolating resistor R51 to a mixing junction J4 which is connected to the input terminal 81 of amplifier 78. A brake current feedback signal, obtained as described hereinafter, is also applied to junction J4 from a lead 88 through an isolating resistor R52. Junction J4 is biased with respect to ground by a resistor R53. A preselected D.C. bias voltage is applied to input terminal 80 of amplifier 78 by a network comprising resistors R55–R59 and a potentiometer R60 while the gain of amplifier 78 is predetermined by a resistor R61 connecting its output terminal 85 to its input terminal 80. The output signal from the terminal 85 of amplifier 78 is applied to the lead 67 described previously.

Figures 5, 6:
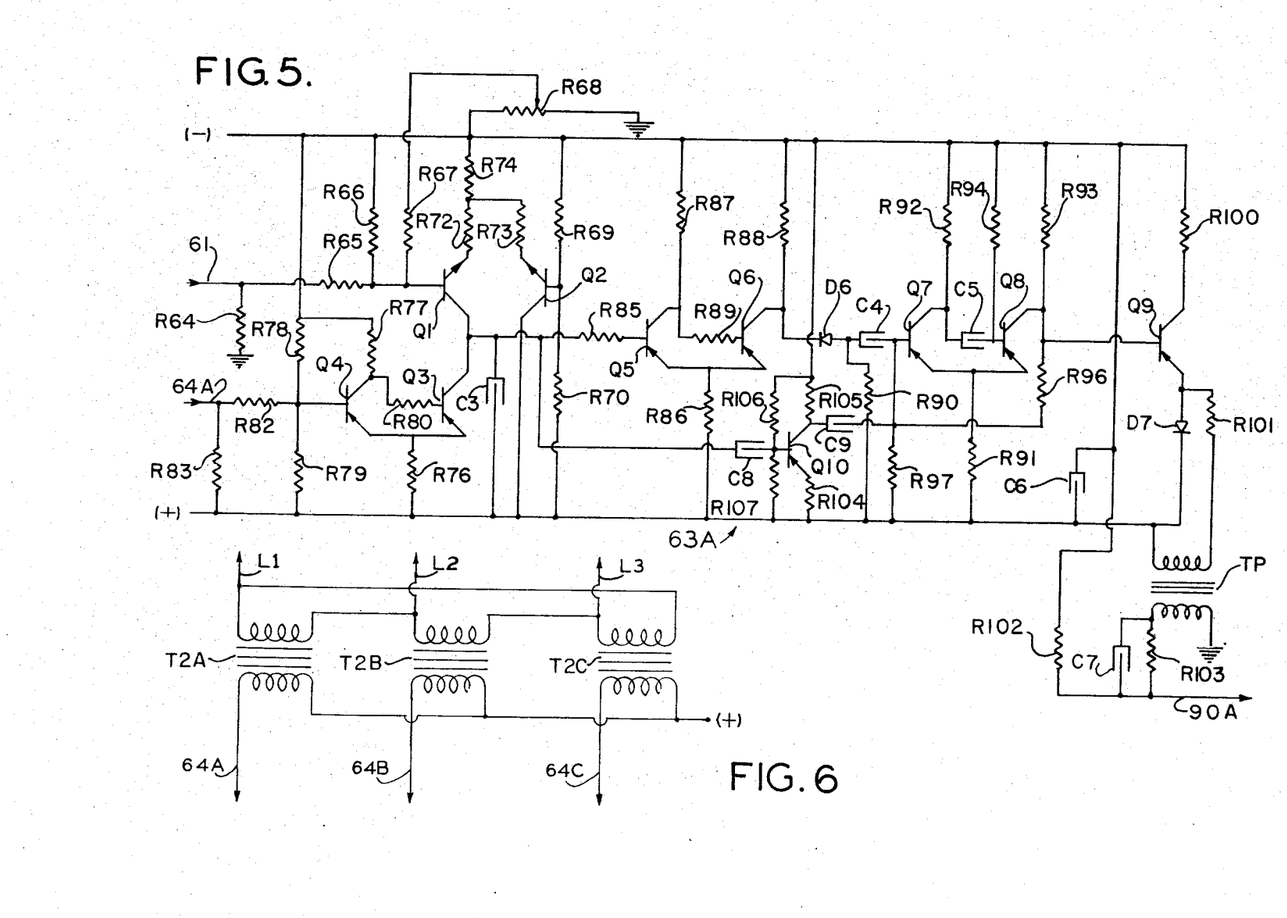
FIG. 5 is a schematic circuit diagram of the pulse generator circuit.
FIG. 6 is a schematic circuit diagram of the synchronizing signal source.

A pulse generator circuit representative of all of the pulse generators to which the signals on leads 61 and 67 are applied is shown in FIG. 5. The signal present at lead 61 or 67 is applied, through a network comprising resistors R64 and R65, to the base terminal of one of a pair of NPN transistors Q1 and Q2 which are connected in a differential amplifier circuit. A preselected bias is applied to the base terminal of transistor Q1 by resistors R66 and R67 and a potentiometer R68 and to the base terminal of transistor Q2 by resistors R69 and R70. The emitters of transistors Q1 and Q2 are connected to the negative supply lead through respective resistors R72 and R73 and a common resistor R74 which provides coupling between the transistors. The collector of transistor Q2 is connected to the positive supply terminal directly while the collector of transistor Q1 is connected to one side of a timing capacitor C3. The other end of capacitor C3 is connected to the positive supply lead. The end of capacitor C3 which is connected to the collector of transistor Q1 is also connected to the collector of one (Q3) of a pair of transistors Q3 and Q4 which are operated as a Schmitt trigger or level sensing circuit. The emitters of transistors Q3 and Q4 are connected to the positive supply lead through a common resistor R76 and the collector of transistor Q4 is connected to the negative supply lead through a load resistor R77. A predetermined bias is applied to the base terminal of transistor Q4 by resistors R78 and R79 and the collector of transistor Q4 is connected to the base of transistor Q3 through a resistor R80 to provide the sharp switching characteristic of the Schmitt trigger circuit.

A synchronizing signal from one of the leads 64A–64C (see FIG. 1) is applied to the base of transistor Q4 by means of a network comprising resistors R82 and R83. The synchronizing signal may, for example, be merely a single phase A.C. signal having the same frequency and a predetermined phase relationship to the respective power supply phase for which the pulse generator provides triggering pulses. As shown in FIG. 6, the synchronizing signal source 64 in the preferred embodiment illustrated comprises three transformers T2A, T2B and T2C the primary windings of which are delta-connected to leads L1, L2 and L3 and the secondary windings of which are interconnected with leads 64A, 64B and 64C and the positive source to provide three single-phase synchronizing signals at different respective phase angles.

During the portion of each cycle when the synchronizing signal is negative with respect to the trip threshold of the Schmitt trigger, transistor Q4 is turned on and transistor Q3 is turned off thus allowing capacitor C3 to charge from transistor Q1. When, however, the synchronizing signal becomes positive with respect to the trip threshold, the conditions of transistors Q3 and Q4 are reversed and capacitor C3 is discharged through the collector of transistor Q3. Thus the charging and discharging of capacitor C3 is synchronized with the frequency of the A.C. supply.

Capacitor C3 is also connected, through a resistor R85, to the base terminal of one (Q5) of a pair of PNP transistors Q5 and Q6 which are also connected as a Schmitt trigger. The emitters of transistors Q5 and Q6 are connected to the positive supply lead through a resistor R86 and the collectors of the transistors are connected to the negative supply lead through respective load resistors R87 and R88. The collector of transistor Q5 is connected to the base of transistor Q6 through a resistor R89 giving this circuit its sharp switching characteristic. When capacitor C3 is discharged, the Schmitt trigger circuit will be in a first state in which transistor Q5 is turned off and transistor Q6 conducts. However, when capacitor C3 charges to a predetermined threshold level, determined by the characteristics of the Schmitt trigger circuit, the circuit will sharply switch into a second state in which transistor Q5 conducts and transistor Q6 is cut off.

The collector of transistor Q6 is connected, through a diode D6 and a capacitor C4, to the base of one (Q7) of a pair of transistors Q7 and Q8 which are connected in a monostable or so-called one-shot multivibrator circuit. The junction between diode D6 and capacitor C4 is biased to the positive supply lead by a resistor R90. The emitters of transistors Q7 and Q8 are connected to the positive supply lead through a common resistor R91 and their collectors are connected to the negative supply lead through respective load resistors R92 and R93. Transistor Q8 is normally biased into conduction by current flowing through a resistor R94 connecting its base to the negative supply lead. The collector of transistor Q8 is coupled to the base of transistor Q7 through a network comprising resistors R96 and R97 to provide the regeneration necessary for the monostable switching. The collector of transistor Q7 is connected to the base of transistor Q8 by a timing capacitor C5 the value of which, together with that of resistor R94, determines the period of the monostable operation of the circuit in known manner.

The collector of transistor Q8 is also connected to the base of a PNP transistor Q9 which is operated as an emitter-follower amplifier. The collector of transistor Q9 is connected to the negative supply lead through a resistor R100 while its emitter is connected, through a resistor R101, to the primary winding of a pulse transformer TP. The primary winding together with resistor R101 are shunted by a diode D7 for suppressing switching transients. One side of the secondary winding of transformer TP is grounded and the other side is coupled to a respective pulse output lead 90A–90C through a coupling capacitor C7. A negative D.C. bias is applied to the output line by means of a network comprising resistors R102 and R103.

As will be apparent to those skilled in the art, whenever the Schmitt trigger circuit comprising transistors Q5 and Q6 switches from a state in which Q6 conducts to one in which Q5 conducts, a negative-going pulse is coupled to the base of transistor Q7 initiating a monostable cycle of operation which generates a pulse of predetermined amplitude and duration at the respective output lead 90A–90C.

In addition to being triggerable by the Schmitt trigger circuit comprising transistors Q5 and Q6, which responds to the charge on capacitor C3, the monostable multivibrator circuit can also be triggered by the Schmitt trigger circuit comprising transistors Q3 and Q4. The collector of transistor Q3 is coupled through a capacitor C8 to the base terminal of a PNP transistor Q10. The emitter of transistor Q10 is connected to the positive supply lead through a resistor R104 and its collector is connected to the negative supply lead through a resistor R105. A predetermined bias is applied to its base through a network comprising resistors R106 and R107. The collector of transistor Q10 is coupled to the base of transistor Q7 in the monotable multivibrator circuit through a capacitor C9. Accordingly, when the Schmitt trigger circuit comprising transistors Q3 and Q4 operates to discharge capacitor C3, that positive-going pulse is inverted by transistor Q10 and the resulting negative-going pulse is applied to the base of transistor Q7 to initiate a monostable cycle of operation.

The pulse generating circuit illustrated in FIG. 5 is operative to provide synchronized triggering pulses at a phase angle which can be varied in response to the amplitude of a control signal applied thereto in substantially the following manner. The differential amplifier comprising transistors Q1 and Q2 applies to capacitor C3 a charging current which varies as a function of the control signal applied through lead 61 or 67. Thus, the rate of charging of this timing capacitor is controlled as a composite function of the respective reference and feedback signals. The Schmitt trigger circuit comprising transistors Q3 and Q4 permits capacitor C3 to actually charge only during a predetermined portion of each cycle of the respective A.C. supply phase as determined by the synchronizing signal provided through leads 64A–64C. If, during the charging portion of the cycle, the voltage on capacitor C3 reaches the threshold of the Schmitt trigger circuit comprising transistors Q5 and Q6, this trigger circuit will switch initiating a monostable cycle between the pair of transistors Q7 and Q8. The pulse thereby generated is applied through transistor Q9 and transformer TP to the pulse output lead 90A–90C. As the charging rate of capacitor C3 is variable by means of the control signal applied through lead 61 or 67 it will be seen by those skilled in the art that the time within each A.C. cycle at which the pulse is generated is also varied as a function of the control signal. By varying the amplitude of the control signal, the phase angle may thus be varied over substantially the entire portion of the cycle during which capacitor C3 is permitted to charge. For a purpose which is explained in greater detail hereinafter, the range of control is designed to include relatively late phase angles in relation to the respective power supply phase.

If capacitor C3 does not charge to the threshold of the Schmitt trigger circuit comprising transistors Q5 and Q6 within the permitted charging period, a triggering pulse will still be generated at the end of the charging period since the monostable multivibrator is triggered through transistor Q10 when the charging period is terminated by the Schmitt trigger circuit comprising transistors Q3 and Q4.

Figure 7:
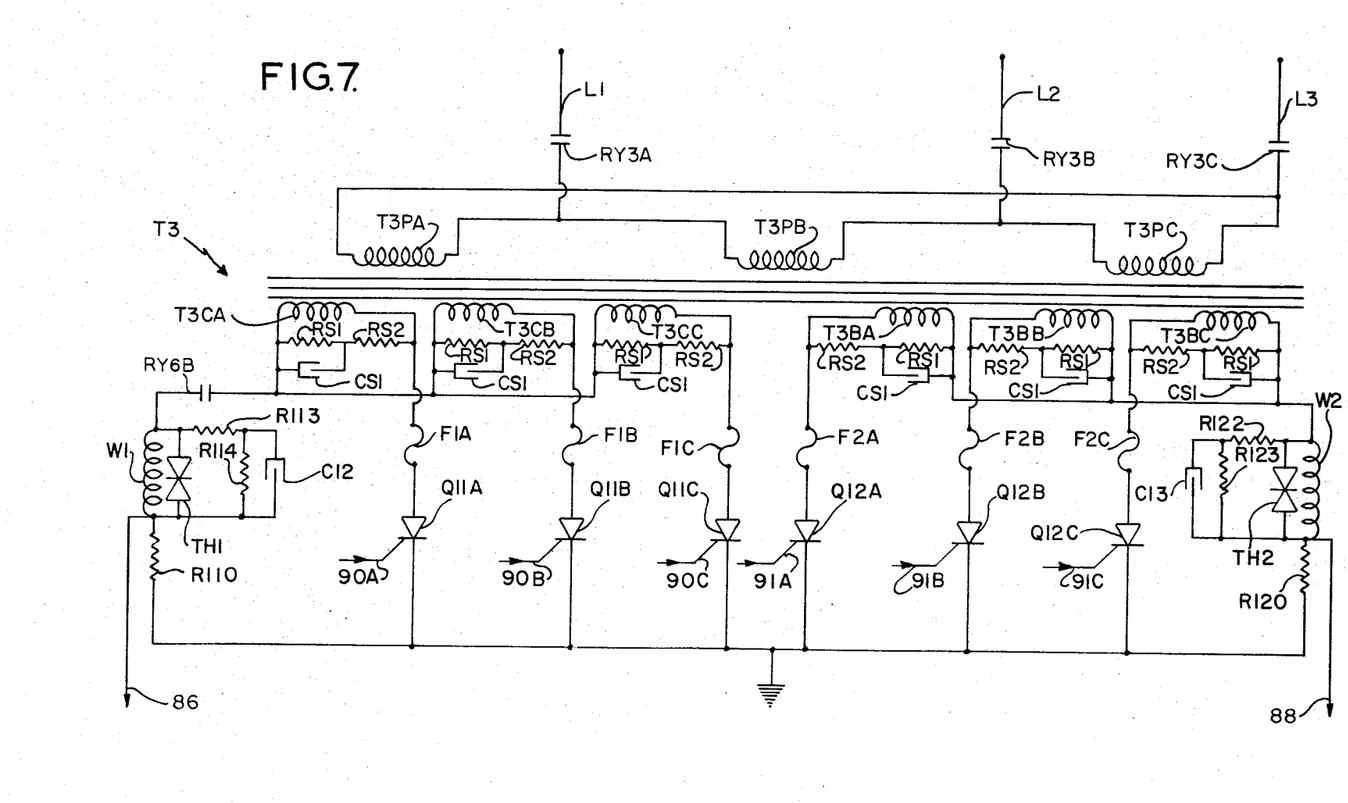
FIG. 7 is a schematic circuit diagram of the three-phase power switching circuit.

The triggering pulses provided by the pulse generators 63A–63C and 69A–69C control the operation of the three-phase power switching circuits 65 and 71 which are illustrated in detail in FIG. 7. Three-phase power from the supply lines L1, L2 and L3 is applied, through contacts RY3A–RY3C, to the delta-connected primary windings T3PA–T3PC of a three-phase transformer T3. Transformer T3 includes two sets of three-phase secondary windings. One set T3CA, T3CB and T3CC supplies the clutch winding W1 and the other set T3BA, T3BB and T3BC supplies the brake winding W2. Each of these secondary windings is shunted by a transient suppressing network comprising a pair of resistors RS1 and RS2 and a capacitor CS1.

Each of the clutch secondary windings T3CA–T3CC is connected in series with a respective SCR (silicon controlled rectifier) Q11A–Q11C across the eddy current clutch energizing winding W1. A respective fuse F1A–F1C is interposed in the anode lead of each of the SCR's. A low value resistor R110 in series with the clutch winding W1 provides a voltage signal at lead 86 which varies substantially in proportion to the amplitude of the clutch winding current. This signal is applied to the mixing juncton J2 in the clutch amplifier 55 through resistor R27 as described previously with reference to FIG. 4. Winding W1 is shunted by a transient suppressing network including a thyrite suppressor TH1, a pair of resistors R113 and R114 and a capacitor C12.

Each of the brake secondary windings T3BA–T3BC is connected in series with a respective SCR Q12A–Q12C across the eddy current brake energizing winding W2. The anode circuit of each SCR Q12A–C includes a respective protective fuse F2A–F2C. A resistor R120 provides a voltage signal to lead 88 which varies in amplitude substantially in proportion to the magnitude of the brake winding current. This signal is applied to the mixing junction J4 in the brake amplifier 57 through resistor R52 as described previously with reference to FIG. 4. Winding W2 is shunted by a transient suppressing network comprising a thyrite suppressor TH2, a pair of resistors R122 and R123 and a capacitor C13.

To the gate terminals of SCR's Q11A–Q11C are applied the triggering pulses provided by the pulse generators 63A–63C through the leads 90A–90C respectively, the pulses provided by each generator being synchronized with the respective power supply phase and being provided at a phase angle which is variable in response to the composite amplified signal provided by the clutch amplifier 55 through lead 61.

To the gate electrodes of SCR's Q12A–Q12C are respectively applied the triggering pulses provided by the pulse geneartors 69A–69C through the leads 91A–91C, these pulses being applied in synchronism with the respective power supply phases and at phase angles which are varied in response to the composite signal provided through lead 67 by the brake amplifier 57.

The net or average voltage applied to each of the windings varies as the phase angle of triggering of the respective SCR's is varied, early triggering within each respective portion of the three-phase cycle producing high energization of the winding and late triggering producing reduced energization of the winding. The windings W1 and W2 are not shunted by so-called flyback diodes for conducting the inductively stored current between successive portions of the three-phase cycle. Accordingly, the inductive character of the winding will cause each SCR to continue to conduct until the next SCR is triggered even though the instantaneous voltage applied to the winding opposes the current flow. Thus, if the phase angle of triggering is abruptly retarded after the winding W1 has been previously highly energized, a net or average voltage is applied to winding W1 which opposes the current flow.

Energy inductively stored in winding W1 is thus returned to the source relatively rapidly rather than being allowed to be dissipated relatively slowly by resistive dissipation within the winding. This process of returning inductively stored energy to the source is referred to herein and elsewhere in the art as "inversion." The various thresholds in the pulse generator circuits and other related parameters are selected so that triggering pulses which are generated at the late end of the possible range of phase angles occur at a time producing a high degree of inversion. Thus the energization levels of the clutch winding and brake winding will respond rapidly to changes in the relative amplitudes of the reference and feedback signals.

When the press is running, the speed control apparatus which has just been described operates to maintain the speed of the press substantially at the preselected level represented by the amplitude of the reference signal substantially in the following manner. The tachometer feedback signal provided at line 53 and the reference signal provided at line 49 are mixed at junctions J1 and J3 to provide at each of those junctions a signal which may conveniently be considered to constitute an error signal. That is, the amplitude of this signal varies as a function of the deviation of the actual instantaneous speed of the press from the desired speed. In the clutch amplifier the error signal is amplified and applied to the respective pulse generator circuits 63A–63C to control the power passed by the power switching circuit so that the average voltage applied to the clutch winding W1 increases as the instantaneous speed of the press falls below the preselected speed. However, as the winding W1 constitutes an inductive load, the current flowing through winding W1 and the torque transmitted to the press from the flywheel do not vary directly with the voltage applied to winding W1 but only as a delayed function thereof. Further, a voltage swing large enough to produce a rapid response would damage the winding if it were allowed to persist after the current in the winding had reached the desired level. To permit the use of a high gain and voltage drive and to thereby speed up the response of the clutch, current feedback is applied from resistor R110 (FIG. 7) through lead 86 and resistor R27 to the mixing junction J2 (FIG. 4). The average voltage applied to the clutch thus varies not only as a function of the algebraic difference between the reference and tachometer feedback signals but also as an inverse function of the clutch winding current. Increasing clutch current is thus operative to decrease the voltage applied to the clutch winding as the current comes up to the desired level so that the clutch winding is not overenergized and thereby damaged. This current feedback thus allows a relatively high source voltage to be temporarily employed in initially energizing the clutch and to thereby obtain "forcing" of the clutch winding at relatively high voltage levels to obtain rapid response. Since the range of phase angles covered by the pulse generators 63A–63C includes late phase angles which cause energy inductively stored in winding W1 to be returned to the source by "inversion" as explained previously, it can also be seen that the winding W1 may be rapidly deenergized to rapidly reduce the transmitted torque when the speed of the press increases relative to the desired speed.

The brake winding W2 is energized in an essentially similar manner by its respective amplifier and pulse generating circuits 57, 69A–69C except that its energization varies inversely relative to that of the clutch due to the inverting function of the amplifier 57. In other words, the voltage applied to the brake winding thus varies as an inverse function of the algebraic difference (as present at junction J3) between the reference and tachometer feedback signals and also as an inverse function of the brake winding current. The energization of the brake winding W2 thus increases as the instantaneous speed of the press rises above the desired speed thereby tending to bring the speed of the press back to the desired speed. Since the brake winding W2 is also an inductive load, the current feedback applied from resistor R120 (FIG. 7) through resistor R52 to the mixing junction J4 in the brake amplifier 57 (FIG. 4) speeds the current and torque response of the brake in relation to changes in relative amplitudes of the feedback and reference signals. As in the clutch control section, the phase angle range of the pulse generators 69A–69C is selected to provide "inversion" for rapidly deenergizing the respective inductive winding W2 when the instantaneous speed of the press falls in relation to the desired speed.

To prevent operation of the press 11 if the speed control circuitry just described should fail to operate for any reason, the press drive system illustrated incorporates a safety circuit as indicated at 59 in FIG. 1 which is operative to completely stop the press if the actual instantaneous speed of the press does not substantially equal the desired speed within a predetermined time interval. For this purpose, the feedback signal provided at line 53 and the reference signal provided at line 49 are applied to the safety circuit.

Figure 8:
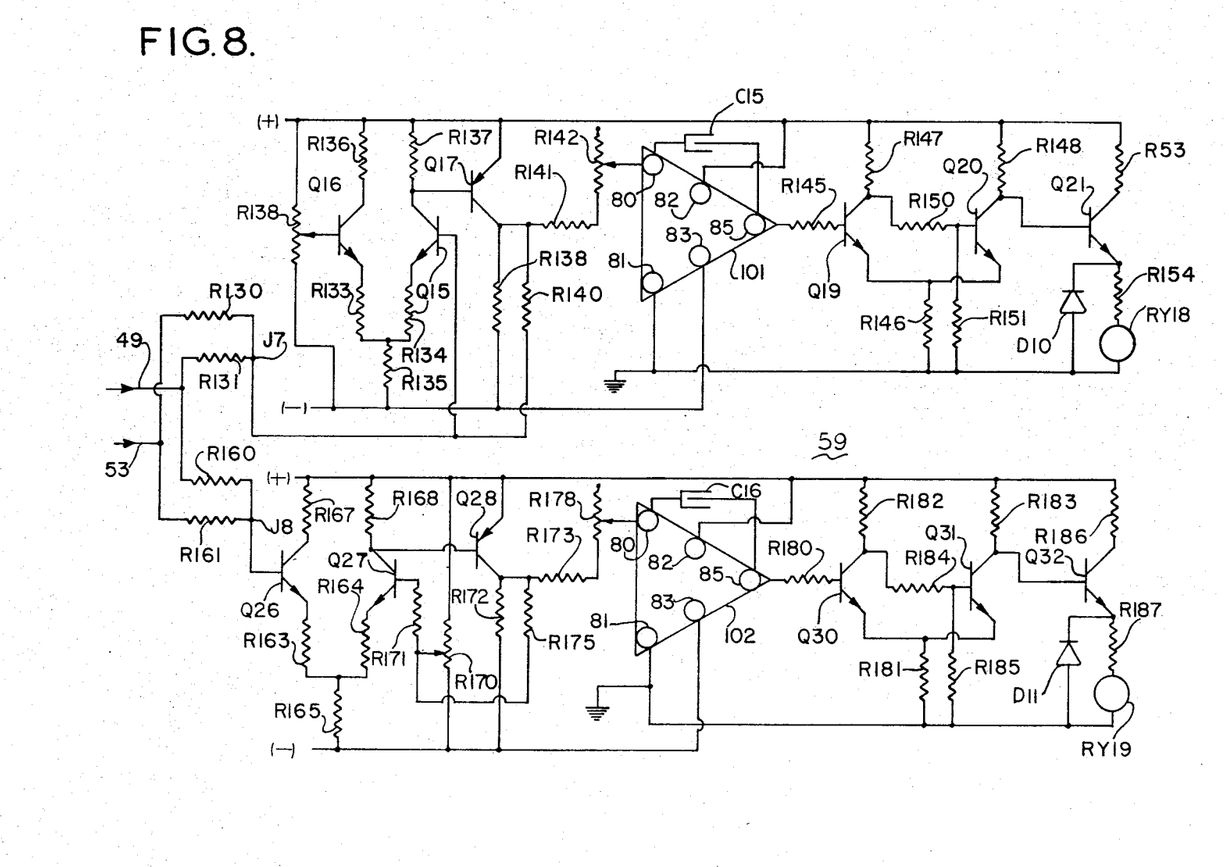
FIG. 8 is a schematic circuit diagram of the safety control circuit.

Referring now to FIG. 8, the reference and feedback signals are applied, through respective isolating resistors R130 and R131, to a mixing junction J7. The voltage provided at junction J7 is thus an error signal and has an amplitude which is substantially proportional to the algebraic difference between the actual and desired speeds of the press. Junction J7 is connected to the base of one (Q15) of a pair of NPN transistors Q15 and Q16 which are interconnected in the high gain differential amplifier or level sensing circuit. The emitters of transistors Q15 and Q16 are connected to the negative supply lead through respective resistors R133 and R134 and a common resistor R135 and their collectors are connected to the positive supply lead through respective load resistors R136 and R137. A preselected bias is applied to the base of transistor Q16 by means of a potentiometer R138. An output signal, taken from the collector of transistor Q15, is applied to the base of a PNP transistor Q17 the emitter of which is connected directly to the positive supply lead and the collector of which is connected through a load resistor R138 to the negative supply lead. A regenerative or positive feedback signal is applied from the collector of transistor Q17 to the base of transistor Q15 through resistor R140 to give the circuit comprising transistors Q15–Q17 sharp switching characteristics somewhat in the manner of a Schmitt trigger circuit. It will be seen by those skilled in the art that this circuit will switch to a state in which transistor Q17 conducts whenever the error signal provided at junction J7 exceeds a predetermined threshold determined by the setting of potentiometer R138. This occurs when the actual press speed is below the desired speed by a predetermined margin.

The sharply switched signal provided at the collector of transistor Q17 is applied, through a resistor R141 and a rheostat R142, to one (80) of the two input terminals 80 and 81 of a differential operational amplifier 101. Operational amplifier 101 is essentially similar to those operational amplifiers described previously with reference to FIG. 4 and the same reference characters have been employed to indicate terminals having the same amplifier function. The other input terminal 81 of amplifier 101 is grounded.

The output terminal 85 of amplifier 101 is connected to input terminal 80 through a capacitor C15 and the amplifier 101 thus functions as an integrator in known manner. In other words, the capacitor C15 will charge or discharge at a substantially constant rate and the voltage at the output terminal 85 will rise or fall at a substantially constant rate when a current of fixed amplitude is applied to input terminal 80, depending whether the current flow is out of or into the terminal 80 respectively. During normal running transistor Q17 remains cut off, the voltage at input terminal 80 remains low, and the output voltage at terminal 85 remains high. If, however, the error signal provided at junction J7 exceeds the preselected threshold of the switching circuit comprising transistors Q15–Q17, the voltage of the output terminal 85 of amplifier 101 will fall at a predetermined rate selected by the adjustment of rheostat R142.

Output terminal 85 is connected, through a resistor R145, to the base of one (Q19) of a pair of transistors Q19 and Q20 which are connected in a Schmitt trigger circuit. The emitters of transistors Q19 and Q20 are connected to the ground through a common resistor R146 and their collectors are connected to the positive supply lead through respective load resistors R147 and R148. The collector of transistor Q19 is connected to the base of transistor Q20 through a network comprising resistors R150 and R151 thereby providing regenerative coupling which gives the circuit sharp switching characteristics. The collector of transistor Q20 is connected to the base of an NPN transistor Q21 which is operated as an emitter-follower. The collector of transistor Q21 is connected to the positive supply lead through a resistor R153 and its emitter is connected, through a resistor R154, to one side of a relay winding RY18 the other side of which is grounded. Winding RY18 and resistor R154 are shunted by a diode D10 for suppressing switching transients.

During normal running the output voltage from terminal 85 of amplifier 101 is relatively high as noted previously and the relay winding RY18 is thus energized. If, however, the charge on capacitor C15 changes so that the output voltage at terminal 85 of amplifier 101 falls below the predetermined trip threshold of the Schmitt trigger circuit comprising transistors Q19 and Q20, this trigger circuit switches to a state in which transistor Q19 is cut off and transistor Q20 conducts thereby turning off transistor Q21 and deenergizing the relay winding RY18. This occurs if the actual speed of the press remains substantially below the desired speed for longer than a predetermined interval so that the charge on the capacitor C11 and the voltage at terminal 85 fall below the threshold of the Schmitt trigger circuit.

An essentially similar circuit operates when the actual speed of the press substantially exceeds the desired speed, e.g., if the press should fail to decelerate properly or if it should for any reason exceed the desired speed. For this purpose the reference and feedback signals are applied, through respective isolating resistors R160 and R161 to a mixing junction J8. Junction J8 is connected to the base of one (Q26) of a pair of NPN transistors Q26 and Q27 connected in a high gain differential amplifier or level sensing circuit. The emitters of transistors Q26 and Q27 are connected to the negative supply lead through respective resistors R163 and R164 and a common resistor R165. Their collectors are connected to the positive supply lead through respective resistors R167 and R168. A preselected bias voltage is applied from a potentiometer R170 to the base of terminal Q27 through a resistor R171. The collector of transistor Q27 is connected to the base of a PNP transistor Q28 the emitter of which is connected to the positive supply lead and the collector of which is connected to the negative supply lead through a load resistor R172. A regenerative or positive feedback signal is applied from the collector of transistor Q28 through a resistor R175 and the resistor R171 to provide sharp switching and level sensing characteristics in the circuit comprising transistors Q26–Q28. As will be apparent to those skilled in the art, the circuit involving transistors Q26–Q28 operates in a manner complementary to the circuit comprising transistors Q15–Q17 described previously. In other words, the circuit comprising transistors Q26–Q28 switches to a state wherein transistor Q28 is turned on when the error signal at junction J8 falls below a preselected threshold chosen by the adjustment of the potentiometer R170.

The collector of transistor Q28 is connected through a resistor R177 and a rheostat R178 to the input terminal 80 of a differential operational amplifier 102 which is interconnected with a capacitor C16 to operate as an integrator in the same manner as the amplifier 101 described previously. The output signal from amplifier 102 is applied to a Schmitt trigger circuit comprising transistors Q30 and Q31 and resistors R180–R185 which in turn drives an emitter-follower amplifying stage comprising a transistor Q32 with associated resistors R186 and R187 to selectively deenergize a relay winding RY19 when the output signal from the amplifier falls below the threshold of the trigger circuit comprising transistors Q30 and Q31. Relay winding RY19 and resistor R187 are shunted by a diode D11 for shunting switching transients. By analogy from the description of the operation of the relay winding RY18 it will be seen that the relay winding RY19 will be energized if, due to overspeed operation, the error signal provided at junction J8 remains below the threshold determined by the setting of potentiometer R170 for longer than a predetermined interval.

Relay windings RY18 and RY19 operate contacts RY18A and RY19A respectively which are connected in series with parallel-connected relay windings RY7 and RY8 (FIG. 2). Thus, when either relay winding RY18 or RY19 is deenergized, windings RY8 and RY7 are likewise deenergized. Deenergization of these latter windings, by opening contacts RY8A and RY7A, causes the deenergization of relay windings RY1 and RY3 which control the energization of the motor 19 and the eddy current clutch and brake power switching circuits respectively. The deenergization of winding RY8 also opens contacts RY8B which causes relay winding RY4 to release the mechanical brake operating relay RY9 through the action of contacts RY4A thereby completing the stopping of the press. Thus, if the error signals which are provided at junctions J7 and J8 and which represent the deviation of the actual instantaneous speed of the press from the desired speed deviate from predetermined limits for longer than respective preselected intervals, the motor and the eddy current coupling will be deenergized and the mechanical brake will be set, thereby stopping the press.

Potentiometers R138 and R170 are adjusted so that, when the actual speed of the press is substantially equal to the preselected speed, the error signal provided at junction J7 is slightly below the threshold of the level sensing circuit comprising transistors Q15–Q17 and the error signal provided at junction J8 is slightly above the threshold of the level sensing circuit comprising transistors Q26–Q28. Thus, in this "normal" state of operation neither of the integrating circuits involving amplifiers 101 and 102 are charging or timing. The tolerance between these sensed thresholds effectively establishes a "deadband" in which the press is considered as behaving normally. If, however, either threshold is crossed for longer than a respective interval (determined by the charging characteristics of the respective integrator circuit), the respective relay RY18 or 19 is deenergized thus initiating a complete shutdown of the press.

To initiate a cycle of operation of the press the manual switches SW4 and SW5 are closed. These switches are normally positioned so that the operator must operate one with each hand thereby assuring that his hands will be clear of the press jaws. As contacts RY8B are closed by the winding RY8 whose energization was described previously, the closing of switches SW4 and SW5 energizes relay windings RY4–RY6. The energization of RY4 closes contacts RY4A which in turn energizes winding RY9 to close the contacts RY9A–B (FIG. 1) which energize the winding W3 to release the mechanical brake 43. The manual switches SW4 and SW5 are bridged by a circuit which includes a switch K6 which is operated by the position indicator 45 and contacts RY6A operated by the relay winding RY6. Switch K6 is open only in the vicinity of top dead center of the press and thus once the press moves from this position this parallel circuit provides a holding circuit which will maintain the energization of the press through a full cycle. Relay RY5 operates normally-closed contacts RY5A to an open position thereby disconnecting the reference signal line 49 from ground and simultaneously closes contacts RY5B allowing various predetermined reference signal voltages to be applied to this line through resistor R9. If switch SW3 is closed thereby energizing winding RY10 to close contacts RY10A and to open normally closed contacts RY10B, the voltage provided by potentiometer R5 will take precedence and will establish the preselected speed. This speed setting is employed for inching or very slow advancing of the press to facilitate setting up or adjustment of the press. If, however, the switches SW4 and SW5 are actuated and the switch SW3 is not closed, the voltage provided by potentiometer R6 is applied to line 49. This is the normal or master run speed setting and thus the press then starts up at a speed suitable for normal, e.g., stamping, operations. As the press proceeds in its cycle, different preselected speeds may be provided during different portions of the cycle by means of the switches K1–K4. Switches K1–K4 are closed and opened at preselected angular positions of the press crankshaft 17 as described previously. The various relay windings RY11–RY14 are thus energized sequentially to operate their respective contacts and to thereby substitute the voltages provided by respective ones of the other potentiometers for the voltage provided by potentiometer R6. Energizing relay RY11, for example, substitutes a voltage which is a preselected portion of the potentiometer R6 voltage through potentiometer R7 while the energization of one of the relay windings RY12–RY14 substitutes a voltage selected by means of one of the potentiometers R1–R3 respectively. In this way the speed of the press may be programmed or profiled within a single cycle as, for example, to cause the ram to pass into the workpiece at a precisely controlled low speed while opening and closing the press at high speed thereby to minimize the cycle time.

At the bottom of the press stroke, the switch K5 is closed to apply to lead 49 a voltage preselected by the setting of potentiometer R4. This voltage is typically chosen to provide a speed increase and, since it is applied directly to the lead 49, it dominates all other speed signals to provide extra energy for driving the press through its bottom dead center position, a point where extra energy may be required.

When the press again returns to the top dead center position where switch K6 opens, the resultant deenergization of relay winding RY5 closes contacts RY5A thereby grounding reference signal line 49 and thus calling for zero or stopped speed. The concurrent deenergization of relay winding RY6 opens contacts RY6A breaking the holding circuit to relay windings RY4–6 and also opens contacts RY6B (FIG. 1) thereby deenergizing the clutch winding W1 independently of the speed control circuitry. Relay winding RY4, which preferably has a delayed release characteristic, opens contacts RY4A after a short delay and thus deenergizes relay winding RY9 which in turn deenergizes the winding W3 (FIG. 1) allowing the friction brake 43 to complete the stopping of the press.

If the switches SW4 and SW5 are still closed when the press returns to its top dead center position (or if these switches are shunted by some form of automatic control circuitry as is typically the case) the press control will not pass into the stopping mode of operation just described but rather will pass through this position at the speed dictated by potentiometer R6. If the switches SW4 and SW5 are maintained closed, the press will thus run continually without pausing at the top dead center position. Even though no pauses are introduced, the stroking rate of the press can still be varied over at least a 4 to 1 range by varying the instantaneous rotational speed of the press within its cycle.

Since the feedback speed control circuitry described previously employs tachometer feedback plus current feedback and inversion for "forcing" changes in energization of the inductive eddy current windings, the instantaneous speed of the press very closely follows the preselected desired speeds dictated by the settings of the various potentiometers R1–R7 regardless of substantial changes in the load, e.g., as caused by the forming of a workpiece. Thus, considerable freedom may be exercised in the setting of these potentiometers to provide both a great range of overall speeds or stroking rates and also for providing a variable speed within each press cycle thereby to provide previously unattainable flexibility of operation. By employing the methods and systems of the present invention it is, for example, possible to continually operate a press over a range of stroking rates as great as 10 to 1 without resorting to any gear changing whereas it was heretofore considered impossible to so operate a press over even a 3 or 4 to 1 range of stroking rates. Furthermore, since the speed of the flywheel member remains constant even though the stroking rate is varied, the same kinetic energy is available at any stroking rate within the whole range of control and relatively large amounts of torque can be obtained through the coupling at any given instant to maintain the desired speed. This is to be contrasted with the operation of those continuously adjustable prior art systems in which flywheel speed was lowered to lower press speed, whether by means of an eddy current coupling or otherwise.

Figure 9:
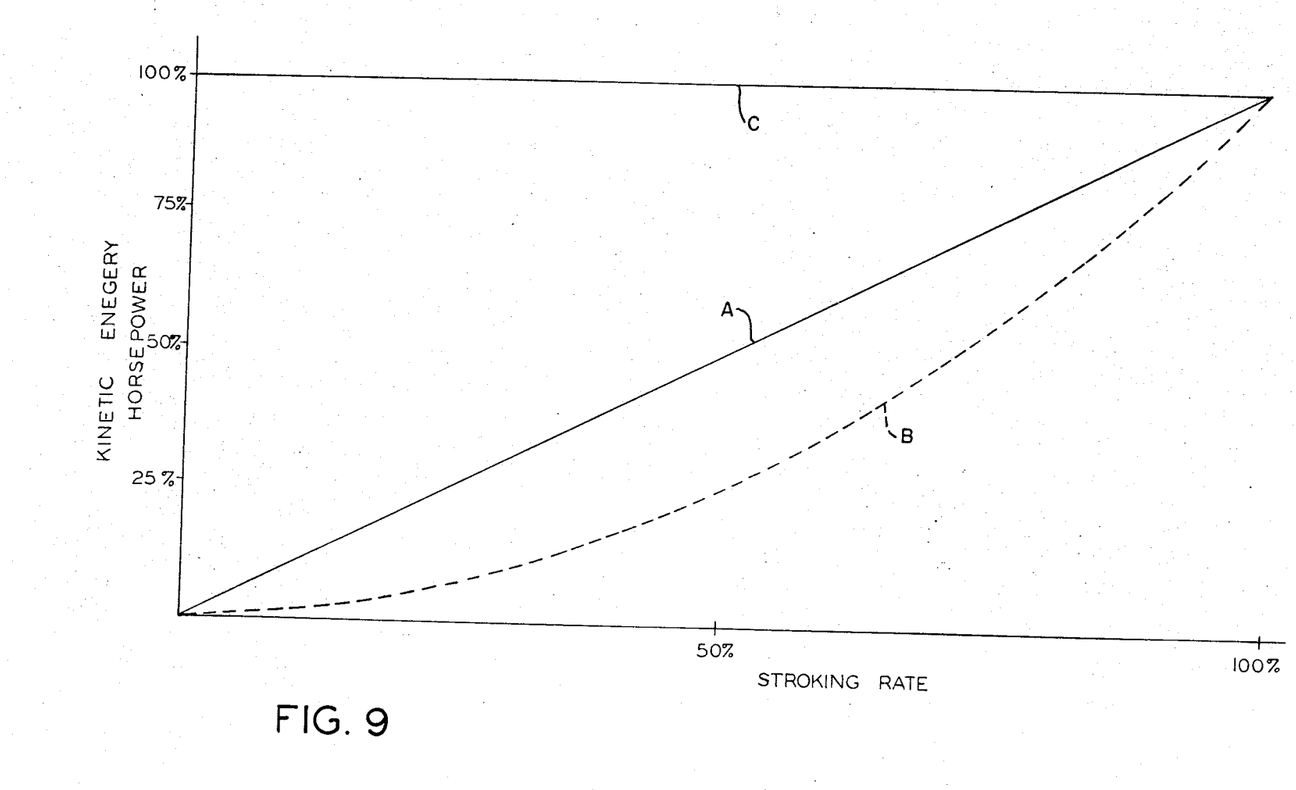
FIG. 9 is a graph including curves representing the power and energy available from a press operated according to the present invention as contrasted with a press operated with a variable flywheel speed.

FIG. 9 includes curves which represent the variations with stroking rate of the available horsepower and kinetic energy in the present system and also in a prior art system in which flywheel speed is varied, both horsepower and kinetic energy being expressed in percentage values. Assuming that both systems employ a constant speed motor and do not involve any complicated gear ratio changing systems, the available horsepower in either system falls in direct proportion to the stroking rate when operated continually, that is, without pauses. This is represented by curve A. The loss in horsepower is caused by the losses necessarily incurred in whatever sort of slip coupling is used to drop the motor speed to the press speed. Since the number of work strokes executed per unit time also falls in direct proportion to the stroking rate, adequate power remains in either mode of operation to restore to the system the energy carried away by the work done on the workpieces.

In the system in which flywheel speed is reduced, however, the available kinetic energy falls off as the square of the flywheel speed. This is represented by curve B. The reduction in available energy drastically reduces the torque which can be drawn from the flywheel and thus reduces the capacity of the press (typically expressed as a tonnage figure). For example, at fifty percent of its maximum stroking rate, a system employing reduced flywheel speed will have available only one quarter of its maximum kinetic energy. This rapid drop in available kinetic energy renders such a press system essentially ineffective or capable of operating only at drastically reduced capacity if the stroking rate is dropped to below half of its maximum rate.

In the present system on the other hand, the available kinetic energy remains substantially constant as is represented at C in FIG. 9. Accordingly, a press operated according to this method may be operated at full capacity at any selected speed within at least a 4 to 1 range of speeds since high instantaneous levels of torque may be drawn from the flywheel rotating at constant speed. It can thus be seen that the present invention makes available a flexibility and range of speed variation not otherwise achievable in continually operated press drives.

Since the use of tachometer feedback plus current feedback and inversion also permit very precise control of the instantaneous speed of a press as described previously, this method of speed control also greatly facilitates the operation of a plurality of presses in synchronism or timed relationship with respect to one another. Such operation of a group of press is particularly useful when successive operations are to be performed on each workpiece by the several presses and when automated handling equipment is to be employed for transferring the workpieces from press to press. The speed control applied to each press is capable of preventing any substantial deviation from the desired common speed and the application, to the respective control amplifiers of a further error signal representing deviation in the phase or timing of the respective press from that of the group will prevent any gradual drift away from the desired synchronous operation even though each of the presses is operated continually, that is, without pause between cycles.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A protective speed control drive system, said drive system comprising:
   a drive member;
   a driving member;
   an eddy current clutch for selectively coupling said driven member to said driving member, said clutch including a winding by means of which said clutch is energized;
   an eddy current brake for selectively braking said driven member, said brake including a winding by means of which said brake is energized;
   means for generating a feedback signal having an amplitude which varies as a function of the instantaneous speed of said driven member;
   means for providing a reference signal having an amplitude which, at each instant, represents a preselected instantaneous speed of said driven member;
   means for energizing said clutch winding to an extent which varies as a function of the algebraic difference between said reference and feedback signals;
   means for energizing said brake winding to an extent which varies as a function of the inverse of the algebraic difference between said reference and feedback signals; and
   means responsive to said reference and feedback signals for stopping said driven member when the algebraic difference between said reference and feedback signals exceeds a preselected value for a predetermined time interval.

2. A drive system as set forth in claim 1 wherein said means for stopping said driven member includes means for generating an error signal which varies as a function of the algebraic difference between said reference and feedback signals, and means for detecting when said error signal exceeds a predetermined threshold.

3. A drive system as set forth in claim 2 wherein said means for stopping said driven member includes a capacitor and means for charging said capacitor at a predetermined rate when said error signal passes said predetermined threshold.

4. A drive system as set forth in claim 3 including means responsive to the charge on said capacitor for stopping said driven member when the charge on said capacitor passes a preselected level.

5. A drive system as set forth in claim 4 wherein said sensing means includes a trigger circuit which switches relatively abruptly from a first state to a second state when said error signal passes said threshold.

6. A drive system as set forth in claim 5 wherein said means for charging said capacitor includes an amplifier having an input circuit and an output circuit, said capacitor being connected in a feedback circuit around said amplifier thereby to integrate a signal applied to the input of said amplifier, and wherein said trigger circuit is operative in said second state to apply a signal of preselected amplitude to the input circuit of said amplifier.

7. A drive system as set forth in claim 3 wherein said means for stopping said driven member includes an electrically controlled mechanical brake and switch means for deenergizing both said eddy current brake and clutch and for operating said mechanical brake to stop said driven member and includes also means responsive to the charge on said capacitor for operating said switch means when said charge passes a predetermined level.

8. A drive system as set forth in claim 1 wherein said means for providing a reference signal provides a D.C. voltage of one polarity and said means for generating a feedback signal provides a D.C. voltage of polarity opposite to said one polarity.

9. A drive system as set forth in claim 8 wherein said means for stopping said press includes means for mixing said D.C. signals of said one and said opposite polarities to obtain an error signal, the amplitude of which represents the difference between the actual speed of said driven member and said preselected speed.

10. A drive system as set forth in claim 9 wherein said means for generating a feedback signal comprises a tachometer generator which generates an A.C. voltage having an amplitude which varies as a function of the speed of said driven member and comprises also means for rectifying and filtering said A.C. to provide said D.C. voltage of said opposite polarity.

11. A protective speed control drive system for a press, said drive system comprising:
- a flywheel;
- means for driving said flywheel;
- an eddy current clutch for selectively coupling said flywheel to said press, said clutch including an inductive winding by means of which said clutch is energized;
- an eddy current brake for selectively braking said press, said brake including an inductive winding by means of which said brake is energized;
- tachometer means for generating a feedback signal having an amplitude which varies as a function of the instantaneous speed of said press;
- means for providing a reference signal having an amplitude which, at each instant, represents a preselected instantaneous speed of said press;
- means for applying to said clutch winding a voltage having an amplitude which varies as a function of the algebraic difference between said reference and feedback signals;
- means for applying to said brake winding a voltage having an amplitude which varies as a function of the inverse of the algebraic difference between said reference and feedback signals;
- electrically operated switching means for stopping said press;
- a first means responsive to said reference and feedback signals for operating said switching means to stop said press when the algebraic difference between those signals exceeds a first predetermined threshold for longer than a first predetermined time interval; and
- a second means responsive to said reference and feedback signals for operating said switching means to stop said press when the algebraic difference between those signals falls below a second predetermined threshold for longer than a second predetermined time interval whereby if the speed of said press substantially exceeds or falls below said preselected instantaneous speed for longer than a respective predetermined interval, said press is automatically stopped.

References Cited

UNITED STATES PATENTS

| | | | |
|---|---|---|---|
| 2,630,467 | 3/1953 | Winther | 310—93 |
| 2,636,138 | 4/1953 | Few et al. | 310—93 |
| 2,809,312 | 10/1957 | Eck et al. | 310—94 |
| 2,816,635 | 12/1957 | Danly et al. | 192—12 |
| 2,931,928 | 4/1960 | Fehn | 310—95 |
| 3,088,063 | 3/1963 | Fehn | 318—161 |
| 3,374,373 | 3/1968 | Calvert | 310—94 |
| 3,374,374 | 3/1968 | Smith | 310—94 |

WARREN E. RAY, *Primary Examiner.*

U.S. Cl. X.R.

72—19; 100—43; 192—12, 103; 310—105; 318—302